L. B. KENNEY.
HORSE COLLAR.
No. 105,580. Patented July 19, 1870.
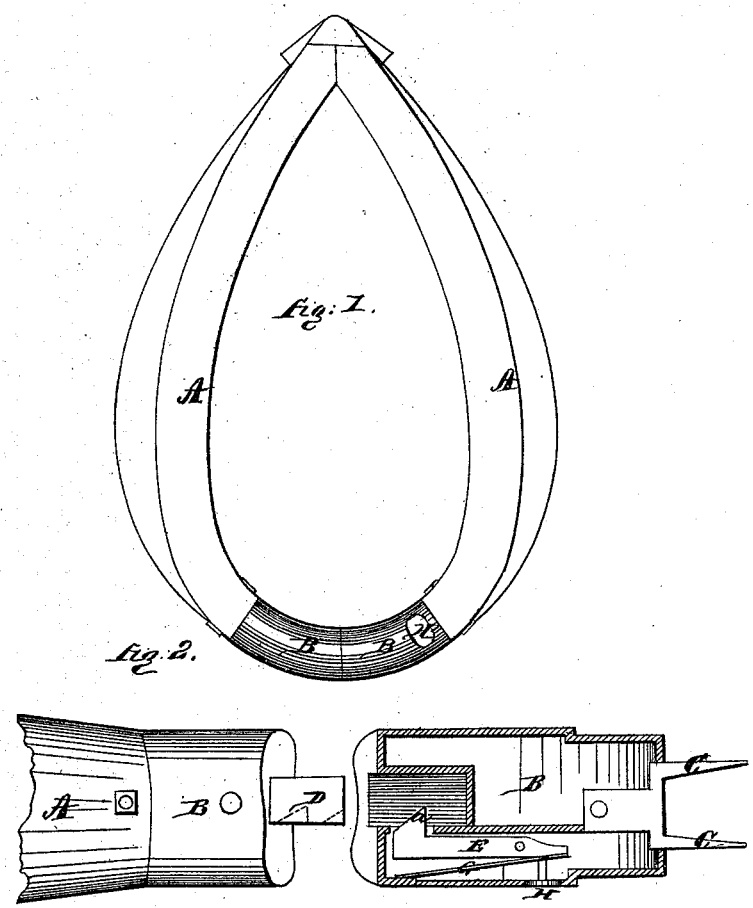

United States Patent Office.

LESTER B. KENNEY, OF CHARLOTTE, MICHIGAN.

Letters Patent No. 105,580, dated July 19, 1870.

IMPROVEMENT IN HORSE-COLLARS.

The Schedule referred to in these Letters Patent and making part of the same.

*To all whom it may concern:*

Be it known that I, LESTER B. KENNEY, of Charlotte, in the county of Eaton and State of Michigan, have invented certain new and useful Improvements in Horse-Collars; and do hereby declare that the following is a full, clear, and exact description thereof, reference being had to the accompanying drawing and to the letters of reference marked thereon, making a part of this specification.

The nature of my invention consists in the construction and arrangement of a coupling attached to the lower end of horse-collars, as will be hereinafter fully set forth.

In order to enable others skilled in the art to which my invention appertains to make and use the same, I will now proceed to describe its construction and operation, referring to the annexed drawing, in which—

Figure 1 is a front view of a horse-collar with my coupling-attachment, and

Figure 2 is an enlarged view, part in section, of the coupling.

A represents a horse-collar, made in any of the known and usual ways, whole or connected at the top, and open at the lower end.

At each end of the collar A is attached a casting, B, formed in two pieces, and secured together by means of screws or bolts.

At the inner end of each casting are fork-shaped steel springs, C C, which extend upward around the bend inside of the collar, for the purpose of maintaining the collar in its proper shape.

One of the castings, B, has a notched bar, D, projecting outward from its outer end, while the other is recessed and provided with a pivoted lever, E, having a hook, *a*, formed on its outer end.

A spring, G, presses this lever in such a manner that, when the two ends of the collar are brought together, and the bar D inserted in the recess, the hook *a* will catch in the notch on said bar and thus lock the collar.

By pressing upon the knob H, which is attached to or connected with the inner end of the lever E, the hook *a* is withdrawn from the bar D, allowing the collar to be opened.

Having thus fully described my invention,

What I claim as new, and desire to secure by Letters Patent, is—

The forked springs C C, connected to the castings B B, said castings being provided with the catching devices for connecting the parts of the collar A, all substantially as set forth.

In testimony that I claim the foregoing, I have hereunto set my hand this 3d day of May, 1870.

LESTER B. KENNEY.

Witnesses:
HENRY A. SHAW,
HENRY F. PENNINGTON.